March 14, 1950    L. L. WHITNEY    2,500,233
FABRICATED BRAKE BEAM

Filed Oct. 9, 1948    4 Sheets-Sheet 1

INVENTOR.
Loren L. Whitney
BY
Atty.

March 14, 1950 L. L. WHITNEY 2,500,233
FABRICATED BRAKE BEAM
Filed Oct. 9, 1948 4 Sheets-Sheet 2

INVENTOR.
Loren L. Whitney
BY
[signature]
Atty.

March 14, 1950     L. L. WHITNEY     2,500,233
FABRICATED BRAKE BEAM
Filed Oct. 9, 1948     4 Sheets-Sheet 3
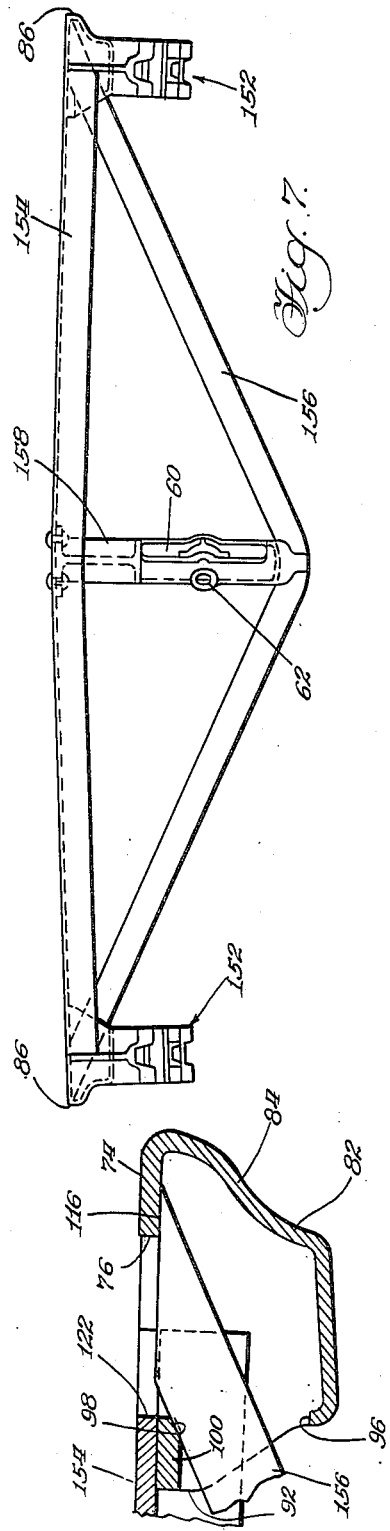
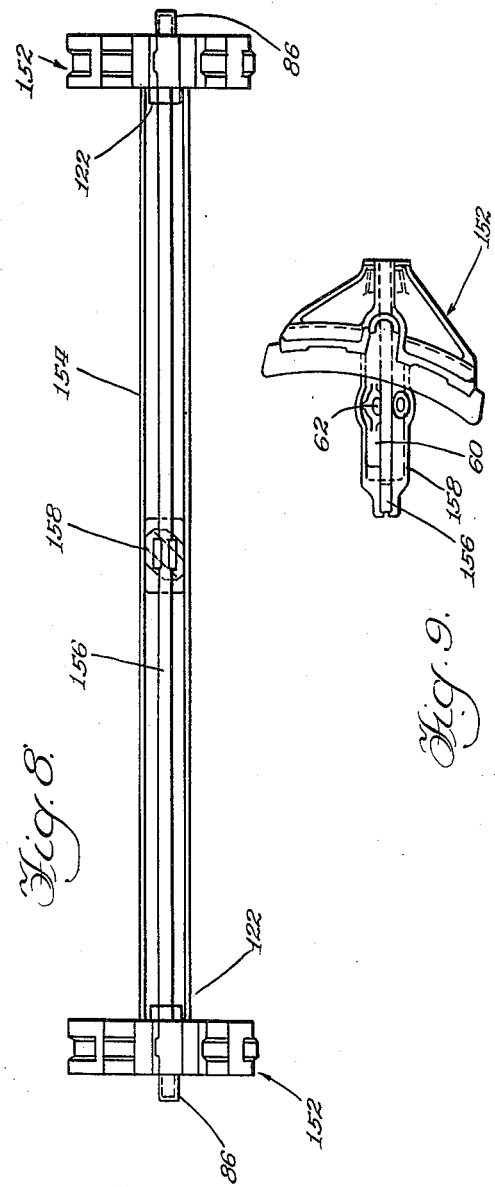
INVENTOR.
Loren L. Whitney
BY March 14, 1950   L. L. WHITNEY   2,500,233
FABRICATED BRAKE BEAM
Filed Oct. 9, 1948   4 Sheets-Sheet 4

INVENTOR.
Loren L. Whitney
BY
Atty.

Patented Mar. 14, 1950

2,500,233

UNITED STATES PATENT OFFICE 2,500,233

FABRICATED BRAKE BEAM

Loren L. Whitney, Hammond, Ind., assignor to American Steel Foundries, Chicago, Ill., a corporation of New Jersey Application October 9, 1948, Serial No. 53,637

11 Claims. (Cl. 188—223.1)

This invention relates to railway brake beams and more particularly to a novel fabricated truss type brake beam of economical construction and capable of withstanding the intense vibrations and severe stresses of railway service.

A general object of the invention is to devise a truss structure which may be fabricated by welding standard sections of steel stock, forming the compression and tension members to which brake heads may be attached.

Another object of the invention is to provide either or both of the compression and brake head members with a rearwardly facing slot complementary to and receiving the outboard end of the tension member to accommodate a welded connection between the tension member and the slotted member at the rear edge of the beam.

A further object of the invention is to devise a brake beam such as above described wherein the brake head is formed with an end extension or lug adapted to support the beam on an associated truck frame ledge.

A more specific object of the invention is to provide a brake head having a hollow lug at its rear inboard corner adapted to be housed within the compression member and having a tension member passage defined by a diagonal surface terminating in a slot at the rear extremity of the brake head outboardly of the lug, the slot communicating with a socket adapted to receive the outboard extremity of the tension member which is welded through the slot.

The foregoing and other objects and advantages of the invention will become apparent from a consideration of the following specification and the accompanying drawings, wherein.

Figure 11:
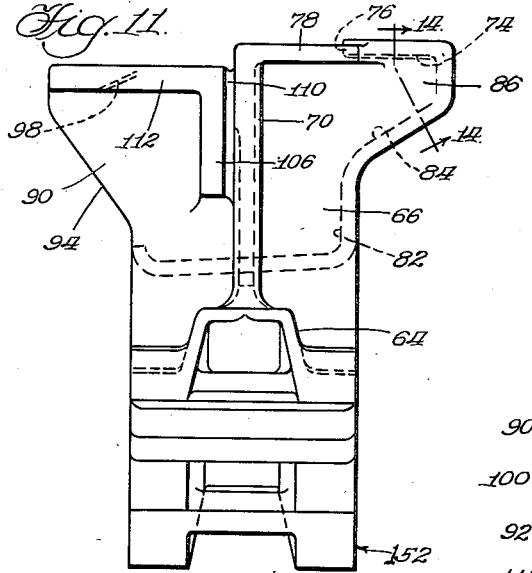
Figure 13:
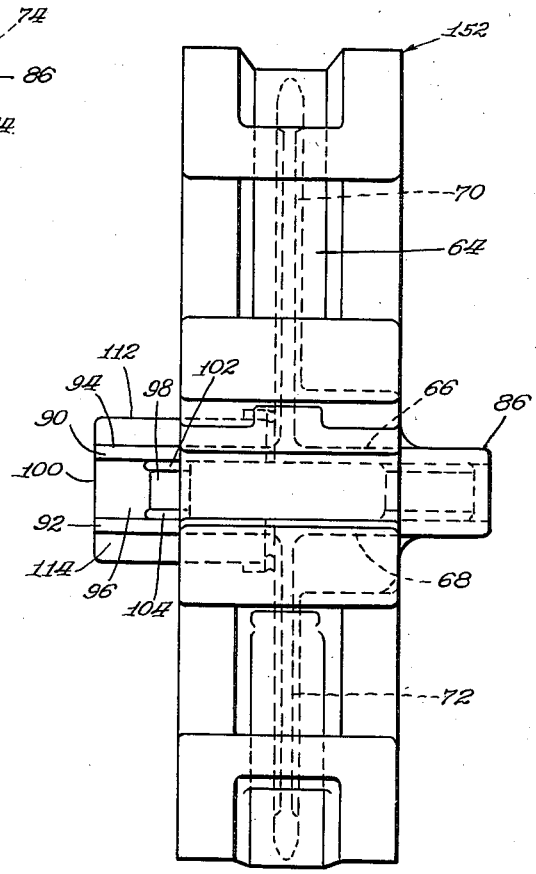
Figure 12:
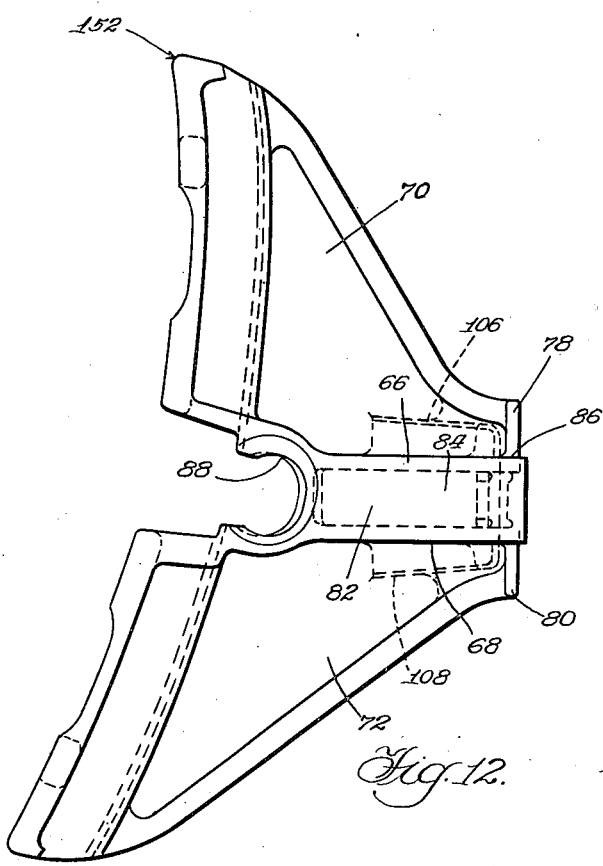
Figure 14:
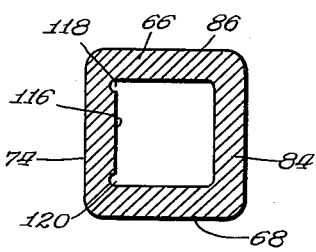

Figures 7 to 14, inclusive, illustrate a modification of a novel beam, Figure 7 being a top plan view, Figure 8 being a front elevational view, Figure 9 being an end view, Figure 10 being an enlarged top plan view partly in horizontal section, Figure 11 being an enlarged top plan view of the brake head, Figure 12 being an outboard side elevational view of the brake head, Figure 13 being a front elevational view of the brake head, and Figure 14 being a sectional view on the line 14—14 of Figure 11.

Figure 1:
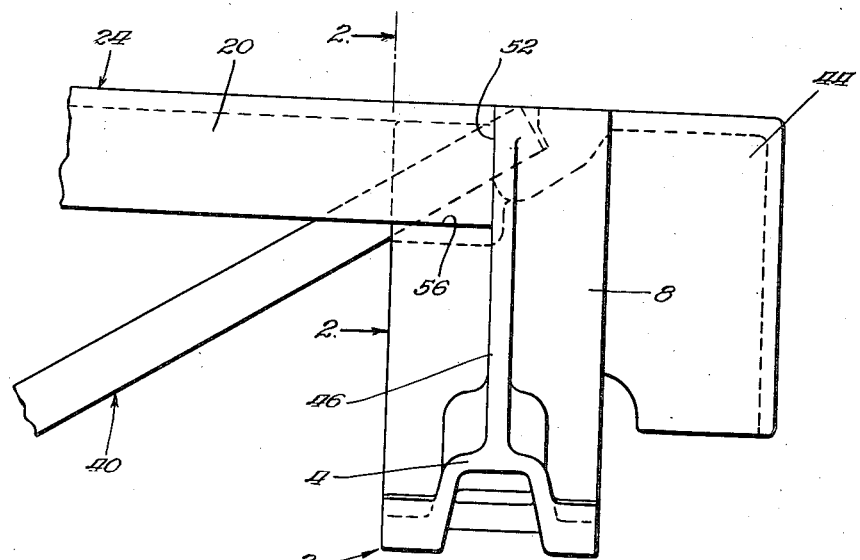
Figure 1 is a fragmentary top plan view of a preferred embodiment of the novel brake beam.
Figure 2:
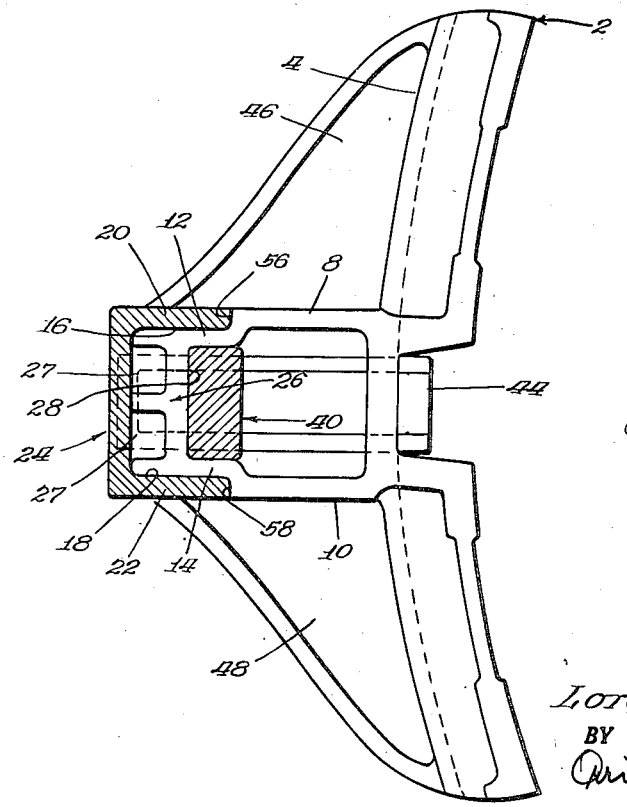
Figure 2 is a sectional view on the line 2—2 of Figure 1.
Figure 3:
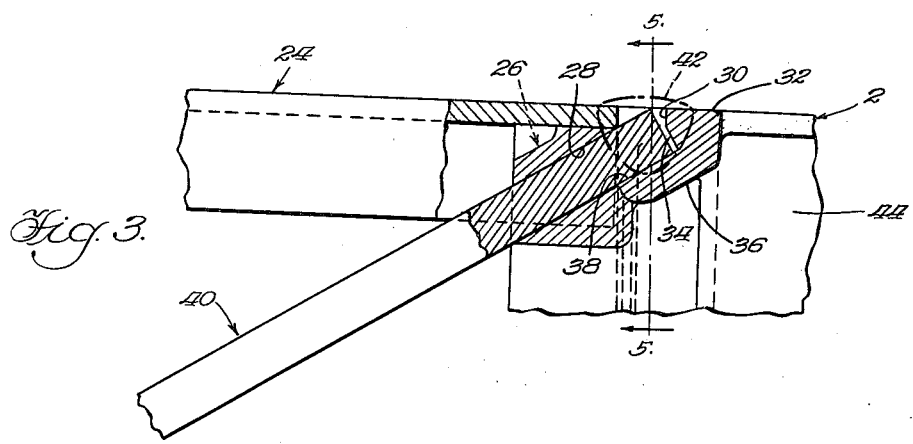
Figure 3 is a fragmentary top plan view, partly in horizontal section.
Figure 4:
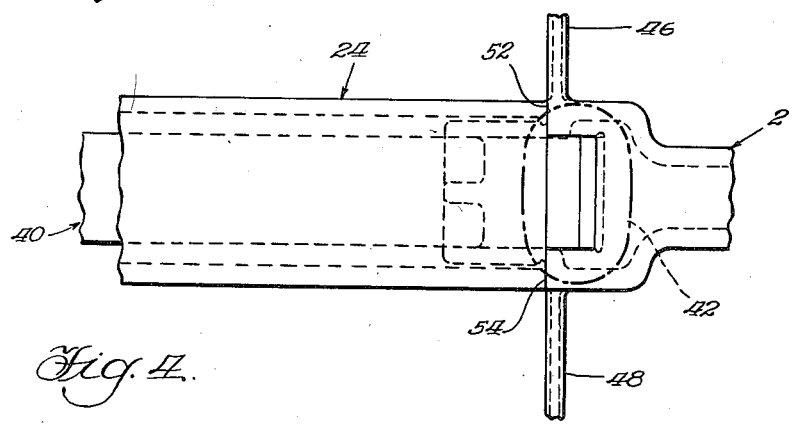
Figure 4 is a rear elevational view.
Figure 5:
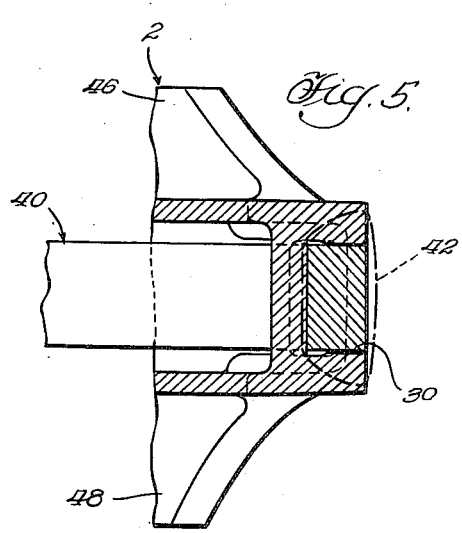
Figure 5 is a sectional view on the line 5—5 of Figure 3.
Figure 6:
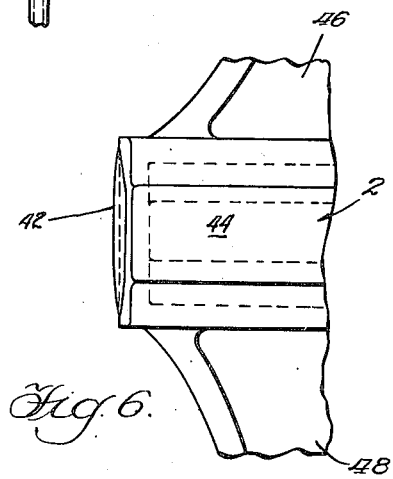
Figure 6 is a fragmentary outboard end view.

Describing the invention in detail and referring first to the preferred embodiment shown in Figures 1 to 6, inclusive, the novel brake beam comprises a brake head, generally designated 2, having a front wall 4 adapted to support associated brake shoe means (not shown) in the usual manner. The rear surface of the front wall is connected to top and bottom walls 8 and 10, as best seen in Figure 2, said walls being offset at their rear inboard corners as at 12 and 14, respectively, to afford seats at 16 and 18 for top and bottom webs 20 and 22 of a generally U-section or channel-section compression member 24.

The offset portions 12 and 14 of the walls 8 and 10 define a relatively narrow hollow lug, generally designated 26, cored away as at 27 to lighten the structure and fitted within the compression member 24, said lug having a diagonal passage defined by a diagonal surface 28 terminating in a slot 30 (Figures 3 to 5) in a rear wall 32 of the brake head. The slot 30 communicates with a socket 34 defined by a substantially vertical brake head wall 36 having a diagonal surface 38 approximately parallel to the surface 28 and disposed outboardly of the lug 26.

A tension member 40 extends through the passage in the lug 26 along the surface 28 thereof and into the socket 34 along the surface 38 of the wall 36. The outboard end of the tension member is received within the socket 34 and is welded through the slot 30, as indicated at 42 in Figures 3 to 5.

It may be noted that the tension member 40 is of uniform cross section from end to end thereof and the compression member 24 is likewise of uniform cross section from end to end thereof to accommodate fabrication of the novel truss structure from sections of standard steel stock, thereby providing a beam of unusually economical construction.

The brake head is preferably provided with an outboard extension or support lug 44 formed by offset portions of the top and bottom walls 8 and 10, the lug 44 being adapted to support the beam on an associated side frame ledge (not shown), as will be readily understood by those skilled in the art.

The brake head also comprises top and bottom substantially vertical webs or ribs 46 and 48 connected between the front wall 4 and the top and bottom walls 8 and 10, respectively, outboardly of the lug 26, the walls 46 and 48 forming shoulders 52 and 54 (Figure 4) affording seats for the outboard end of the compression member 24. The forward edges of the compression member walls 20 and 22, as best seen in Figures 1 and 2, are seated as at 56 and 58, respectively, against shoulders formed by the offset portions 12 and 14 of the brake head walls 8 and 10.

Referring now to Figures 7 to 14, a modification of the novel brake beam is shown. Figures 7 to 9 illustrate the beam in assembled position. A brake head generally designated 152 is secured as hereinafter described to each end of a truss structure comprising a compression member 154, a tension member 156, and a strut 158 connected therebetween, the strut having a brake lever slot 60 and a brake pin hole 62 intersecting the slot.

The detailed construction of the modified beam will be best understood from a consideration of Figures 10 to 14 wherein it will be seen that the brake head 152 comprises a front wall 64 adapted to support associated brake shoe means. The front wall is connected to top and bottom walls 66 and 68 extending rearwardly therefrom and is connected to substantially vertical top and bottom ribs or webs 70 and 72 connected to the walls 66 and 68, respectively.

Outboard the ribs 70 and 72 the top and bottom walls 66 and 68 are formed with a rear wall 74 slotted as at 76 (Figure 10) and having top and bottom extensions 78 and 80 merging with the outboard faces of the ribs 70 and 72 at the rear extremities thereof.

The outboard edges of the top and bottom walls 66 and 68 are formed with an outboard end wall 82 which has a segment 84 curving outwardly to define a lug 86 adapted to support the beam under emergency conditions in the event that associated hanger means (not shown) received within a hanger socket 88 formed at the forward ends of the walls 66 and 68 should fail under service conditions.

The inboard edges of the walls 66 and 68 are provided with extensions 90 and 92 extending inboardly beyond the vertical plane defining the inboard edge of the wall 64 to define a hollow lug 94 having an internal passage 96 containing a diagonal surface 98 formed on a substantially vertical brake head wall 100 interconnecting the inboard edges of the top and bottom extensions 90 and 92 of the top and bottom walls 66 and 68. The wall 100 is provided with arcuate recesses 102 and 104 extending along the seat 98 above and below the latter for a purpose hereinafter discussed.

The top and bottom walls 66 and 68 inboardly of the ribs 70 and 72 are provided with flanges 106 and 108 extending generally parallel to the ribs 70 and 72 and spaced therefrom by arcuate recesses or grooves 110. The rear extremity of the flanges 106 and 108 are provided with inboardly directed extensions 112 and 114 projecting along the extensions 90 and 92 of the top and bottom walls 66 and 68.

The tension member 156 extends through the passage 96 along the tension member seat 98 and bears at its outboard end against a seat 116 relieved at its upper and lower edges as at 118 and 120 to facilitate seating of the tension member. It may be noted at this point that the arcuate recesses 102 and 104 also facilitate seating of the tension member along the surface 98 and along the interior surfaces of the walls 66 and 68.

The compression member 154, as in the previously described embodiment, is a channel-section member fitted over the lug 94 along the flanges 106 and 108 and their extensions 112 and 114, the outboard end of the compression member being seated against the ribs 70 and 72. The rear wall of the compression member 154 is slotted as at 122 to receive the outboard end of the tension member and a weld is laid in the slots 76 and 122 to unite the tension member 156, the compression member 154 and the brake head 152 into a single integral structure. If desired, the outboard edges of the compression member may be welded to the ribs 70 and 72.

I claim:

1. A truss type railway brake beam comprising a compression member having a rear web and spaced top and bottom webs extending forwardly therefrom, a break head member comprising a front wall adapted to support associated brake shoe means, top and bottom walls connected to the rear surface of said front wall, and a rear wall connecting the rear extremities of said top and bottom walls and having a slot, a substantially vertical wall extending between said top and bottom walls and having a diagonal surface extending forwardly and inboardly from said slot, a lug connected to said top and bottom walls and received between said top and bottom webs, a diagonal surface in said lug extending rearwardly and outboardly toward said slot in substantially parallel relationship with the first-mentioned surface, a tension member extending between said top and bottom webs and along said surfaces, and a weld in said slot securing the tension member to said rear web and rear wall.

2. A brake beam comprising a brake head with a front wall adapted to support associated brake shoe means, a portion connected to said wall comprising top and bottom walls offset at their rear inboard corners to define a lug having a passage defined by a diagonal surface, another diagonal surface approximately parallel to the first-named surface and disposed outboard said lug, a rear wall connected to said top and bottom walls outboard said lug and having a slot communicating with said passage, a compression member housing said lug and seated against surfaces of said top and bottom walls forwardly and outwardly of said lug, a tension member extending through said passage along said surfaces and into said slot, and a weld in said slot connecting said brake head portion to said members.

3. A brake beam comprising a brake head with a front wall adapted to support associated brake shoe means, top and bottom walls connected to and extending rearwardly from the front wall, upper and lower substantially vertical webs connecting said top and bottom walls respectively to said front wall, a rear wall connecting the top and bottom walls outboardly of said webs and having a slot, a U-section compression member fitted over said top and bottom walls and seated at its outboard end against said webs, said head presenting a diagonal seat disposed inboardly of said webs and extending rearwardly and outboardly between said top and bottom walls toward said slot, a tension member extending into said compression member and along said seat, and a weld in said slot securing the outboard end of said tension member to said head.

4. A brake beam comprising a brake head with a front wall adapted to support associated brake shoe means, top and bottom walls connected to and extending rearwardly from the front wall, upper and lower substantially vertical webs connecting said top and bottom walls respectively, a rear wall connecting the top and bottom walls outboardly of said webs and having a slot, a U-section compression member fitted over said top and bottom walls and seated at its outboard end against said webs, a tension member extending into said compression member and seated against internal surfaces of said brake head, one of said surfaces being disposed inboardly and the other being disposed outboardly of said webs, and a weld in said slot securing the outboard end of said tension member to said head between said surfaces.

5. A truss type railway brake beam comprising a channel-section compression member of uniform cross section from end to end thereof, said compression member having a rear web and spaced top and bottom webs extending forwardly therefrom, a brake head member having a portion in telescopic relationship with said compression member, a tension element having a diagonal end portion extending between said top and bottom webs in abutment with a diagonal surface of one member, the top and bottom surfaces of said element between said webs being in abutment with complementary flat surfaces of said one member, and a weld through said rear web and confined by said surfaces to prevent escape of molten weld metal during formation of said weld.

6. A truss type railway brake beam comprising a channel-section compression member including a rear web and top and bottom webs extending forwardly therefrom, a tension member extending between said webs, a brake head member connected to the compression member, a vertical weld extending from approximately the top to the bottom of said rear web and connecting the same to said tension member, and surfaces on one of said compression and brake head members confining the top and bottom and the inboard and outboard surfaces of said tension member bounding the welded area thereof.

7. A truss type railway brake beam comprising a compression member, a brake head having a portion bearing against the outboard end of the compression member and having a portion housed within the compression member, said head having a diagonal surface within the compression member and another surface outboard the compression member, said surfaces defining a diagonal passage, a slot in said brake head communicating with the outboard end of said passage, a tension member extending through said passage along said surfaces and into said slot, and a weld in said slot.

8. A truss type railway brake beam comprising a compression member, a brake head having an inboard lug housed within the compression member and having an outboard lug adapted to support the beam, said inboard lug having a diagonal surface partly defining a passage therein, a tension member extending along said surface, and a weld connecting the tension member to the compression member and brake head at a point inboard said outboard lug.

9. A brake head comprising a front wall adapted to support associated brake shoe means, top and bottom walls connected to the rear surface of the front wall, the top and bottom walls being offset at the rear inboard corners thereof to define a lug for reception within an associated brake beam part, said top and bottom walls defining a socket therebetween outboardly of said lug, said lug having a passage therein communicating with said socket.

10. In a brake head comprising a front wall adapted to support associated brake shoe means, top and bottom webs extending rearwardly from the rear surface of the front wall, and a vertical wall connecting each of said top and bottom webs to the rear surface of the front wall, said webs being offset toward each other to define a lug inboardly of said vertical walls.

11. A brake head having a front wall adapted to support associated brake shoe means, a portion connected to the front wall and extending rearwardly therefrom, said portion having top and bottom surfaces offset toward each other at the rear inboard corners thereof to define a lug for reception within an associated brake beam part, and a diagonal passage in said lug between said surfaces for the reception of another associated brake beam part.

LOREN L. WHITNEY.

REFERENCES CITED

The following references are of record in the file of this patent:

UNITED STATES PATENTS

| Number | Name | Date |
|--------|------|------|
| 956,616 | Williams, Jr. | May 3, 1910 |
| 969,861 | Haskell | Sept. 13, 1910 |
| 990,938 | Williams, Jr. | May 2, 1911 |
| 2,206,676 | Schaefer | July 2, 1940 |
| 2,356,720 | Aurien | Aug. 22, 1944 |
| 2,398,917 | Busch | Apr. 23, 1946 |
| 2,419,115 | Busse | Apr. 15, 1947 |